(12) United States Patent
Völker

(10) Patent No.: US 12,398,521 B2
(45) Date of Patent: Aug. 26, 2025

(54) PLATFORM WHEEL DENT

(71) Applicant: Dromos GmbH, Munich (DE)

(72) Inventor: Antje Völker, Munich (DE)

(73) Assignee: Dromos GmbH, Munich (DE)

( * ) Notice: Subject to any disclaimer, the term of this patent is extended or adjusted under 35 U.S.C. 154(b) by 175 days.

(21) Appl. No.: 18/281,012

(22) PCT Filed: Mar. 10, 2022

(86) PCT No.: PCT/EP2022/056148
§ 371 (c)(1),
(2) Date: Sep. 8, 2023

(87) PCT Pub. No.: WO2022/189554
PCT Pub. Date: Sep. 15, 2022

(65) Prior Publication Data
US 2024/0175220 A1   May 30, 2024

(30) Foreign Application Priority Data

Mar. 10, 2021 (GB) ..................................... 2103275

(51) Int. Cl.
*E01F 1/00* (2006.01)
*B60W 60/00* (2020.01)

(52) U.S. Cl.
CPC ........... *E01F 1/00* (2013.01); *B60W 60/0015* (2020.02); *B60W 60/00253* (2020.02)

(58) Field of Classification Search
CPC ...... E01C 11/222; G01C 21/34; B65G 69/005
See application file for complete search history.

(56) References Cited

U.S. PATENT DOCUMENTS

| 6,447,236 | B1 * | 9/2002 | Grams | .................. B65G 47/90 414/265 |
| 2016/0209845 | A1 | 7/2016 | Kojo et al. | |

FOREIGN PATENT DOCUMENTS

| CN | 201648983 U | 11/2010 | |
| CN | 110023568 A * | 7/2019 | ............... E01C 1/00 |

(Continued)

OTHER PUBLICATIONS

MTI Report 12-31 "Automated Transit Networks (ATN): A Review of the State of the Industry and Prospects for the Future, MTI Report 1227". Burford Furman et al. Mineta Transportation Institute Publications (2014).

(Continued)

*Primary Examiner* — Hitesh Patel
*Assistant Examiner* — Tabitha Kress
(74) *Attorney, Agent, or Firm* — 24IP Law Group USA, PLLC; Timothy R. DeWitt

(57) ABSTRACT

A stopping station (15) for use in a transportation network (100) is disclosed. The stopping station (15) comprises a passenger boarding/alighting platform (30) and a plurality of vehicle stopping surfaces (90). The passenger boarding/alighting platform (30) has an upper surface (80) for boarding of passengers into a vehicle (20). The passenger boarding/alighting platform (30) also has a vehicle-facing surface (85) comprising at least two of a cutout (40) for docking of a wheel (45) of the vehicle to the passenger boarding/alighting platform (30). The vehicle stopping surface (90) is adjacent to the vehicle-facing surface (85) and is used for stopping of the vehicle (20) during the boarding/alighting of the passengers in/from the vehicle (20).

15 Claims, 8 Drawing Sheets

(56) References Cited

FOREIGN PATENT DOCUMENTS

| CN | 110281748 A | 9/2019 |
|----|-------------|--------|
| DE | 202010005173 U | 8/2011 |
| EP | 0892112 A | 1/1999 |
| FR | 2882374 A1 | 8/2006 |
| JP | H11-209926 A | 8/1999 |
| KR | 960003930 Y1 | 1/1995 |
| KR | 2003/0084874 A | 11/2011 |
| WO | 2014125040 A | 8/2014 |

OTHER PUBLICATIONS

Society of Automotive Engineers (SAE) in "Taxonomy and definitions for terms related to driving automation systems for on-road motor vehicles" published in Recommended Practice SAE J 3016 on Jun. 15, 2018.

* cited by examiner

PLATFORM WHEEL DENT

FIELD OF THE INVENTION

This application claims priority of the British Patent Application number GB2103275.0, filed on 10 Mar. 2021. The entire disclosure of the British Patent Application number GB2103275.0 is hereby incorporated herein by reference The field of the invention relates to a passenger boarding/alighting platform having cutouts for stopping of a vehicle close to the passenger boarding/alighting platform and methods for the controlling the movement of the vehicle at the passenger boarding/alighting platform having the cutouts.

BACKGROUND OF THE INVENTION

Transportation networks for transportation of passengers between stopping stations often comprise platforms for boarding/alighting of passengers in/from a vehicle. Depending on the type of platform and the type of vehicle used in the transportation network, a gap between the vehicle and the platform is commonly found in today's transportation networks for allowing the vehicle to approach the stopping station before boarding/alighting passengers or for leaving the stopping station after boarding/alighting of the passengers at the stopping station. The passengers have to cross this gap between the vehicle and the stopping station in order to board/alight in/from the vehicle. Crossing this gap can lead to accidents and/or be a disadvantage for disabled passengers. Different solutions for reducing the gap between the vehicle and the platform are known and used in the current transportation networks around the globe, such as extendible or movable platforms, or "kneeling" vehicles.

MTI Report 12-31 "Automated Transit Networks (ATN): A Review of the State of the Industry and Prospects for the Future, MTI Report 1227". Burford Furman et al. Mineta Transportation Institute Publications (2014) discloses different types of stopping stations as currently used in transportation networks. Multiple concepts for stopping vehicles at the side of a road are disclosed. A system for reducing a gap between the vehicle and the platform is not, however, disclosed in the report.

Self-driving cars or vehicles may be used in the transportation networks. Self-driving cars are often described as being "autonomous", but in practice, there are different classes or levels of vehicle autonomy. The degree of vehicle autonomy is typically divided in five levels, as set out by the On-Road Automated Driving (ORAD) committee of the Society of Automotive Engineers (SAE) in "Taxonomy and definitions for terms related to driving automation systems for on-road motor vehicles" published in Recommended Practice SAE J 3016 on 15 Jun. 2018. Level 0 refers to a vehicle that has no driving automation. The driver of the vehicle is fully in charge of operating the movement of the vehicle. Vehicles of Level 0 may include safety systems such as, for example, a collision avoidance alert. Level 1 refers to vehicles having at least one driving assistance feature such as an acceleration or braking assist system. The driver is responsible for the driving tasks but is supported by the driving assist system which is capable of affecting the movement of the vehicle. Level 2 describes vehicles having more than one assist system for actively affecting the movement of the vehicle. The driver, in Level 2, is still responsible for the driving tasks and must actively monitor the trajectory of the vehicle at all times. The driver is, however, actively supported by the assist systems. Level 3 describes a so-called "conditional automation" of the vehicle. The vehicle is capable of autonomously driving in certain situations and with limitations. The driver is not required to actively monitor the assist system but is, however, required to take control of a driving situation if requested by the assist system. Level 4 describes autonomously travelling vehicles which are capable of travelling specific routes under normal conditions without human supervision. The vehicles of Level 4 can therefore operate without a driver but might need remote human supervision in case of conflict situations, travelling in remote areas, or when travelling extreme weather conditions. Level 5 Automation describes fully autonomously driving vehicles. No human interaction is required at any time for the operation of the vehicles.

Korean patent application KR 2003/0084874 A (Eom Gi Yeong et al, assigned to KRRI) discloses a safety device installed on a platform to reduce a gap between a vehicle and the platform. The safety device comprises an elastic member that is connected to a fixing member attached to the platform. The elastic member contacts a door of the vehicle when the vehicle is in the station. This contacting of the door of the vehicle helps to close the gap between the platform and the vehicle. The elastic member for the safety device has different degrees of flexibility in a horizontal direction and a vertical direction. The elastic member is flexible in the horizontal direction and absorbs horizontal forces from the vehicle entering the station by deforming the elastic member. The elastic member is not, however, flexible in the vertical direction and is able to withstand a force applied by a passenger standing on the flexible member. A use of cutouts in the platform for the reducing the gap between the vehicle and the platform is not, however, disclosed in the Korean patent application.

Japanese patent application JP H11-209926 A (Tanaka, assigned to Hino Auto Body Ltd) discloses a stopping platform for a vehicle that is formed by notching a sidewalk, wherein the sidewalk is a surface that is a step higher from the road. The sidewalk is notched to fit the length of one vehicle. The notched part is approximately formed to be in the shape of a triangle. Edging stones are arranged at the edge of the sidewalk to distinguish the platform from the road. The Japanese patent application discloses the notching of the sidewalk to accommodate the vehicle during the boarding/alighting of the vehicle. Specific cutouts for the wheels of the vehicle are not, however, disclosed in the patent application.

The prior art discloses solutions for reducing the gap between the vehicle and the platform and rely on reduction of the size of the gap by separate devices that are attached to the platform or the platform is notched to match the size of the vehicles. The prior art does not, however, disclose a system or method for reducing the gap between the vehicle by allowing the vehicle to stop in immediate proximity to the platform.

SUMMARY OF THE INVENTION

The present document describes a stopping station for use in a transportation network. The stopping station comprises a passenger boarding/alighting platform and a vehicle stopping surface adjacent to the passenger boarding/alighting platform. The passenger boarding/alighting platform comprises an upper surface for boarding of passengers in a vehicle and a vehicle-facing surface. The vehicle-facing surface comprises at least two cutouts for docking a wheel of the vehicle to the cutouts of the passenger boarding/alighting platform. The vehicle stopping surface is used for stopping of the vehicle during boarding/alighting of the passengers in/from the vehicle. The form of the cutout is dimensioned according to a wheel hull curve of the wheel of the vehicle and enables rotation of the wheel when the wheel is docked to the cutout. The number of cutouts on a side of the vehicle facing the passenger boarding/alighting platform correlates to the number of wheels of the vehicle. The stopping station of the present document allows, due to the docking of the wheels to the cutouts of the platform, a reduction in the size of the gap between the vehicle and the platform.

The present document further describes a method for the boarding/alighting of the passengers in/from the vehicle at the passenger boarding/alighting platform. The method comprises approaching of the vehicle to the passenger boarding/alighting platform and aligning the wheels of the vehicle with a plurality of cutouts disposed in the vehicle-facing surface of the passenger boarding/alighting platform. The vehicle is caused to stop proximate to the passenger boarding/alighting platform and the wheels are docked to the cutouts of the passenger boarding/alighting platform. The passengers board/alight the vehicle in/from the vehicle and the vehicle subsequently leaves the stopping station by the vehicle. In one aspect of the method, the vehicle detects the stopping station using an onboard positioning unit and an onboard processor of the vehicle.

The present document further describes a method for management of vehicles at the stopping station in the transportation network.

DETAILED DESCRIPTION OF THE INVENTION

The invention will now be described on the basis of the figures. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
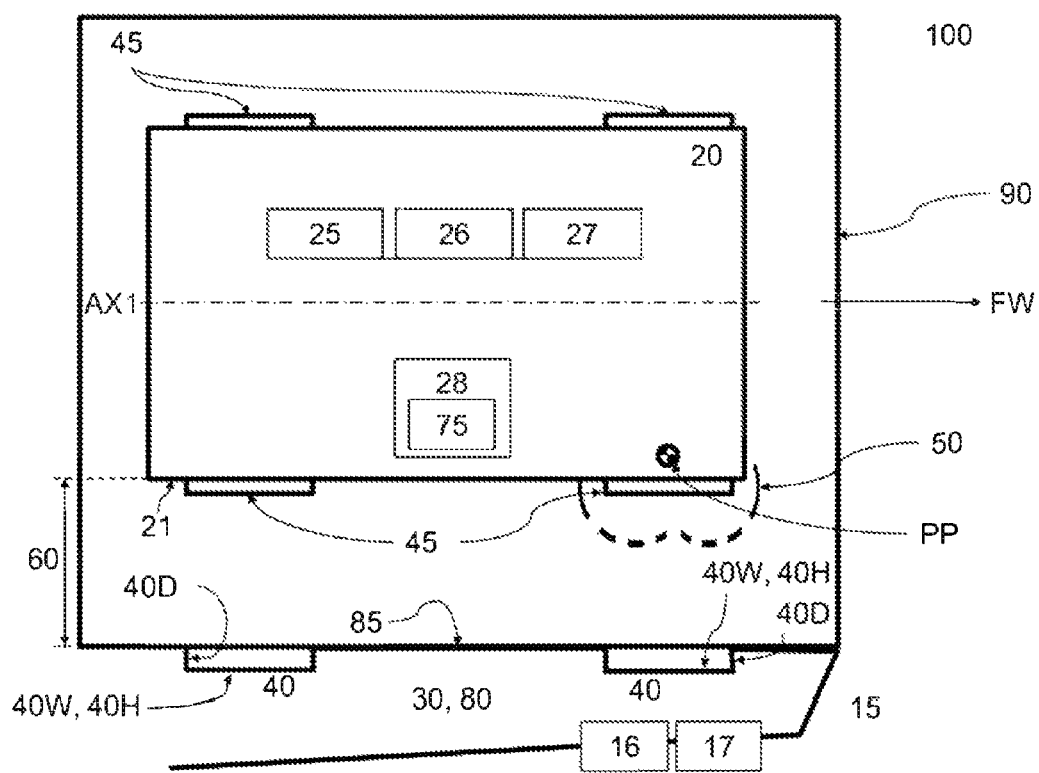
FIG. 1 shows a top view of a stopping station comprising a cutout.

FIG. 1 shows a top view of a stopping station 15 for use in a transportation network 100 with a plurality of autonomous vehicles 20. The stopping station 15 comprises a passenger boarding/alighting platform 30 and a plurality of vehicle stopping surfaces 90 at which the autonomous vehicles 20 can stop to enable boarding and/or alighting of passengers. The plurality of the vehicle stopping surfaces 90 are, for example, arranged adjacent to each other at the stopping station 15. The stopping station 15 further comprises a stopping station control unit 16 and a stopping station communication unit 17. The stopping station control unit 16 knows the position of the vehicle stopping surfaces 90 within the stopping station 15 and is capable of identifying the individual ones of the vehicle stopping surfaces 90 and the stopping station communications unit 17 communicates with ones of the autonomous vehicles 20 at or near the stopping station 15.

The passenger boarding/alighting platform 30 has an upper surface 80 and a vehicle-facing surface 85. The upper surface 80 is for boarding/alighting of passengers (not shown) into a vehicle 20. The vehicle-facing surface 85 is adjacent to the plurality of the vehicle stopping surfaces 90 and comprises at least two of a cutout 40 for docking of a wheel 45 of the vehicle 20. The transportation network 100 comprises a plurality of stopping stations 15 disposed in the transportation network 100 and connected by roads or tracks (not shown). The transportation network 100 comprises at least one vehicle 20 for travelling between the stopping stations 15 by a passenger (not shown).

The transportation network further comprises at least one roadside control unit (not shown) for controlling of the vehicles 20. The roadside control unit is connected to the stopping station control unit 16 and capable of communicating with the vehicle 20. The roadside control unit is used for controlling of the vehicles 20 when travelling between the stopping stations 15 in the transportation network 100. The roadside control unit will inform the stopping station control unit 16 of approaching ones of the vehicles 20. The stopping station control unit 16 will take over from the roadside control unit a management of the vehicles 20 during approaching and departing of the vehicles 20 to/from the stopping station 15 (as is further elaborated in the description of FIGS. 4 to 7).

The vehicle 20 has a front and a rear. The vehicle 20 has a side 21 and a plurality of wheels 45. The wheels 45 are located, for example, near the front and the rear of the vehicle 20. The wheels 45 located at the front of the vehicle 20 are termed front wheels 45f and the wheels 45 located at the rear are termed rear wheels 45r. The wheels 45 can be flush with the side 21 of the vehicle 20, stick out from the side 21 of the vehicle 20, or can be shifted to be underneath the inside of the vehicle 20. This shifting of the wheels 45 to the inside may, however, have an impact on a stability of the vehicle 20 during maneuvering in curves.

The wheels 45 define a wheel hull curve 50 (the wheel hull curve 50 is only shown on one wheel 45 in FIG. 1 for the sake of clarity of the drawing). The wheel hull curve 50 describes a geometrical outline or surface created by possible positions of an outer surface of the wheel 45 when the wheel 45 rotates and moves during the steering of the wheel 45. More precisely, the wheel hull curve 50 describes, as it is used here, the sum of possible positions of the outer surface of the wheel 45 that the wheel 45 might reach during normal steering operation and during normal driving operation. The wheel hull curves 50 of the wheels 45 of the vehicle 20 might be different and depend on, for example, the position of the wheel 45 relative to the vehicle 20.

The vehicle 20 comprises an onboard processor 27, a vehicle memory 28, a vehicle antenna 25, and a vehicle positioning unit 26. The onboard processor 27 is used for calculating a route to the stopping station 15, and on arrival at the stopping station 15, the onboard processor 27 can also be used to calculate the route to a vehicle stopping surface 90 within the stopping station 15. The vehicle memory 28 is used for storing a structure model 75. The structure model 75 comprises items of data on the transportation network 100 and a position of the stopping stations 15 in the transportation network 100. The vehicle memory 28 is also used for storing further items of data on, for example, the route of the vehicle 20. The vehicle antenna 25 is used for communicating, for example, with beacons disposed in the transportation network 100 or, for example, with the stopping station control unit 16 of the stopping station 15. The onboard positioning unit 26 is used for detecting (see also step S100 described in FIG. 6) the stopping station 15 in the transportation network 100. The vehicle 20 also includes assist systems of Level 2 or Level 3, as described above. The vehicle 20 is, in one aspect, capable of autonomously travelling in the transportation network 100, using the structure model 75 and the onboard processor 27. The vehicle 20 does therefore not require a driver for driving of the vehicle 20.

The wheels 45 can be steered individually or in groups by the onboard processor 27. A first group for the steering of the wheels 45 are the front wheels 45$f$ and a second group for the steering are the rear wheels 45$r$. The steering of the wheels 45 comprises rotating of the wheels 45 around a pivot point PP (the pivot point PP is only shown on one wheel 45 in FIG. 1 for the sake of clarity of the drawing). This rotating of the wheel 45 for the steering of the wheel 45 comprises changing an orientation of the wheel 45 relative to the direction of a longitudinal center axis AX1 of the vehicle 20 around the pivot point PP. The pivot point PP of the wheel 45 is, when seen from above (as depicted in FIG. 1), located inside of the wheel hull curve 50, inside of the wheel 45, or inside of the vehicle 20.

The wheels 45 are driven individually or in groups by one or several motors (not shown) for powering the vehicle 20. For example, one group are the front wheels 45$f$ and another group are the rear wheels 45$r$. In a further aspect, only one of the groups of the front wheels 45$f$ or the rear wheels 45$r$ is powered by the motor. The other one of the groups of the front wheels 45$f$ or the rear wheels 45$r$ is not powered by the motor.

The wheels 45 can be attached to the vehicle 20 at a camber angle for improving stability of the vehicle 20 during maneuvering or steering around a curve. The camber angle describes an angle between a vertical axis of the vehicle 20 and a vertical axis of the wheel 45, as viewed from the front of the vehicle 20. A negative camber angle (upper portion of the wheels 45 leaning inward/towards the center axis AX1 of the vehicle 20) can, for example, improve the stability of the vehicle when maneuvering through a sharp curve.

The number of cutouts 40 disposed on the passenger boarding/alighting platform 30 correlates to the number of the wheels 45 on one side of the vehicle 20. The cutout 40 is dimensioned according to the wheel hull curve 50 of at least one wheel 45 of the vehicle 20 and enables rotation of the docked wheel 45 within the cutout 40. A gap 60 between the vehicle 20 and the passenger boarding/alighting platform 30 of the stopping station 15 can be reduced by enabling the wheel 45 to rotate in the docked position. The cutout 40 is dimensioned to have a cutout width 40$w$, a cutout height 40$h$, and a cutout depth 40$d$. The cutout width 40$w$, the cutout height 40$h$, and the cutout depth 40$d$ are dimensioned based on the wheel hull curve 50.

The cutout 40 can, in a first aspect, be dimensioned to be similar to the wheel hull curve 50 in shape and size. The wheels 45 will dock closely to the cutout 40 in this first aspect. The cutout 40 can, in a second aspect, also be dimensioned to be similar in shape to the wheel hull curve 50 but to be bigger in size than the wheel hull curve 50. The wheels 45 will dock to the cutout 40 with an offset in this second aspect. The cutout 40 could, in a third aspect, also be dimensioned to be different in shape and/or size from the wheel hull curve 50. The cutout 40 will be dimensioned to accommodate at least the wheel hull curve 50 in this third aspect. The gap 60 is reduced in the first to the third case by allowing the wheel 45 to rotate in the cutout 40.

Figure 2:
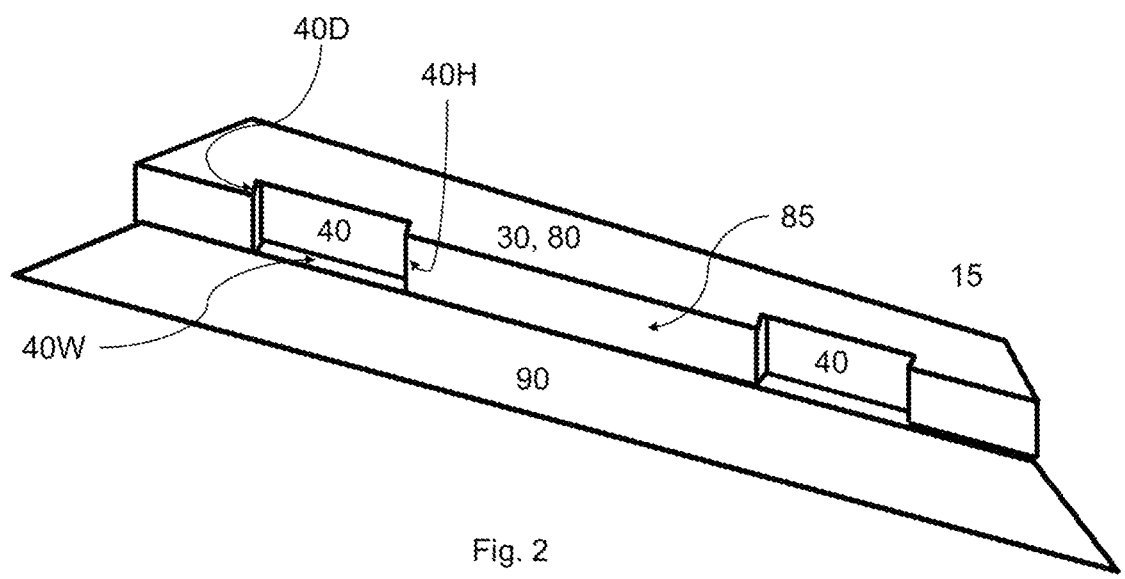
FIG. 2 shows a perspective view of the stopping station comprising the cutout.

FIG. 2 shows a perspective view of the stopping station 15 in the transportation network 100. FIG. 2 shows the stopping station 15 comprising cutouts 40 extending from the upper surface 80 of the passenger boarding/alighting platform 30 to the plurality of the vehicle stopping surfaces 90 adjacent to the passenger boarding/alighting platform 30. The cutout height 40$w$ is the same as a vertical distance (step) between the upper surface 80 and the plurality of the vehicle stopping surfaces 90.

FIGS. 3A, 3B, 3C, and 3D show different examples of the cutouts 40 for the docking of the wheels 45 to the passenger boarding/alighting platform 30. The vehicle 20 approaches (step S120 described in FIG. 6) the passenger boarding/alighting platform 30 by driving onto one of the plurality of the vehicle stopping surfaces 90. A driving path of the vehicle 20 during the approaching of the vehicle 20 to the passenger boarding/alighting platform 30 depends on, for example, the number of wheels 45 being steered by the onboard processor 27.

Figure 3A:
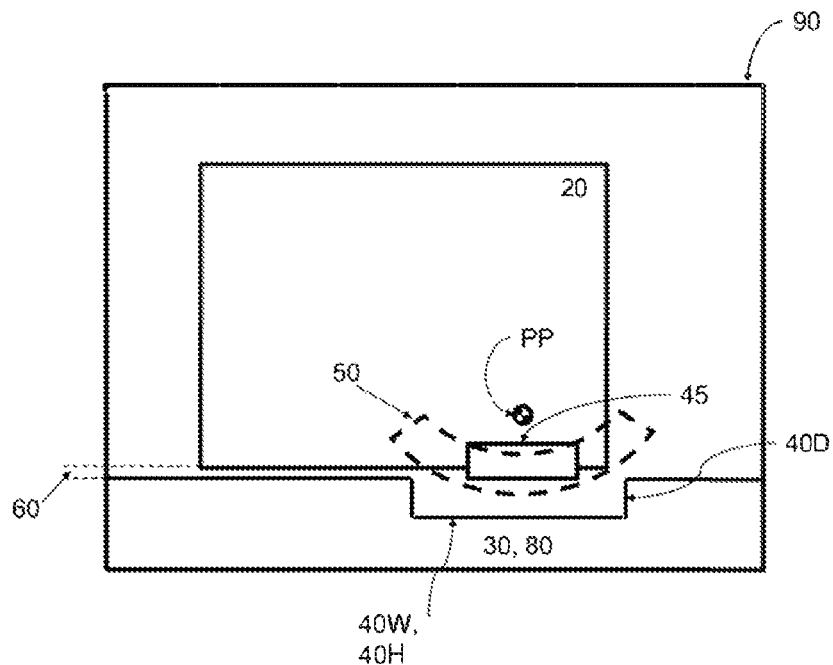
FIGS. 3A, 3B, 3C, and 3D show a perspective view of a vehicle stopping at the stopping station.

The cutouts 40 are dimensioned according to the wheel hull curve 50 as shown in FIG. 3A. In this first example, the wheel 45 rotates around the pivot point PP within the wheel hull curve 50. The cutout width 40$w$, the cutout height 40$h$, and the cutout depth 40$d$ are dimensioned to allow the wheel 45 to rotate around the pivot point PP during the approaching (see step S120) and the docking (see step S150) of the vehicle 20 to the passenger boarding/alighting platform 30. The docking of the wheel 45 to the cutout 40 enables the vehicle 20 to stop proximate to the passenger boarding/alighting platform 30. The gap 60 between the vehicle 20 and the vehicle-facing surface 85 of the passenger boarding/alighting platform 30 is therefore reduced.

Figure 3B:
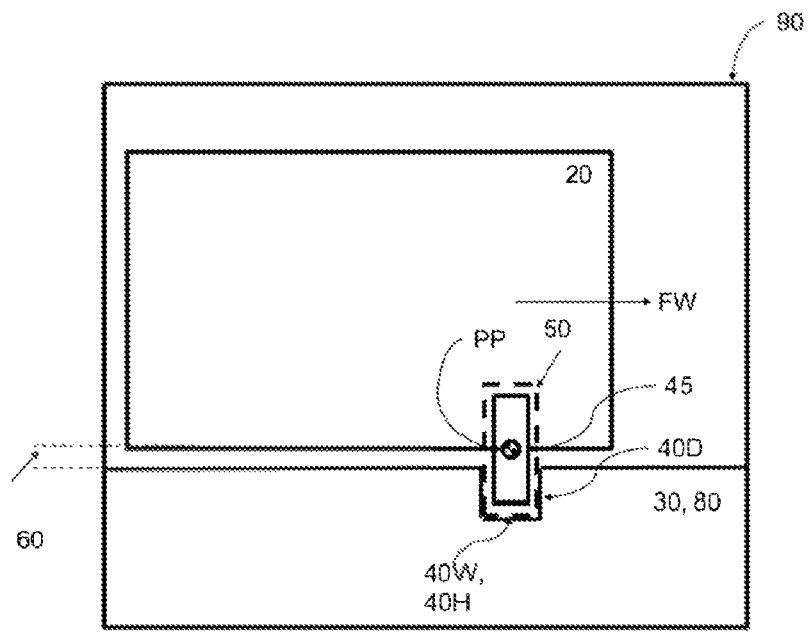

FIG. 3B shows a second example of the cutout 40. The vehicle 20 approaches the stopping station 15 by driving sideways in this second example. The wheels 45 are rotated by a 90° steering angle relative to the forward driving direction FW of the vehicle 20. The vehicle 20 can therefore drive sideways for the approaching (see step S120) and the docking (see step S150) of the vehicle 20 to the passenger boarding/alighting platform 30. Setting the wheels 45 to the similar or identical angle relative to the vehicle 20 allows the vehicle 20 to approach the passenger boarding/alighting platform 30 by driving sideways. The driving sideways of the vehicle 20 allows a reduction in the size of the plurality of the vehicle stopping surfaces 90 as the vehicle 20 is capable of maneuvering in a small surface/area. The driving sideways of the vehicle 20 therefore allows the vehicle to approach the passenger boarding/alighting platform 30 in a fast and efficient manner. The driving sideways could also be done by rotating the wheels at angles other than 90° relative to the forward driving direction FW for the approaching of the station 15. The wheels 45 could also be set to 45°, to 60°, or at other angles relative to the forward driving direction FW enabling the driving sideways of the vehicle 20.

In this second example, the cutout width 40$w$ corresponds substantially to the width of the wheel 45. In this second example, the cutout depth 40d is dimensioned to allow the wheel 45 to dock into the cutout 40 partially or entirely. This docking of the wheels 45 allows the vehicle 20 to stop proximate to the passenger boarding/alighting platform 30. The gap 60 is therefore also reduced in this second example.

Figure 3C:
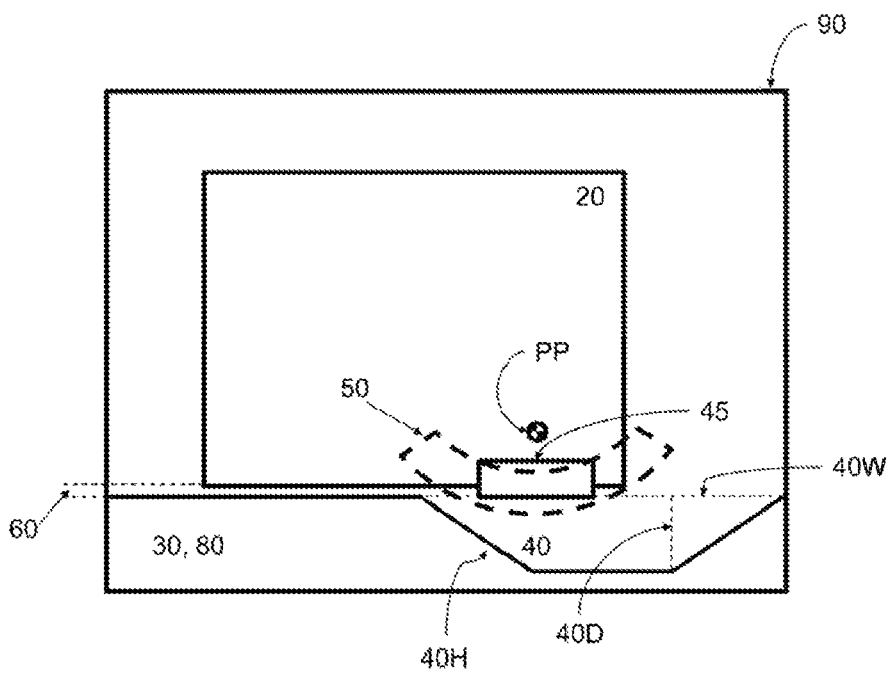

FIG. 3C shows a third example of the cutout 40. The cutout 40 is dimensioned to be of different shape and size compared to the wheel hull curve 50 in the third example. The cutout 40 of the third example is dimensioned to accommodate the wheel hull curve 50 with an additional space between the wheel 45 and the cutout 40. The gap 60 between the vehicle 20 and the passenger boarding/alighting platform 30 will be reduced by allowing the wheel 45 to rotate in the cutout 40 when in the docked position.

Figure 3D:
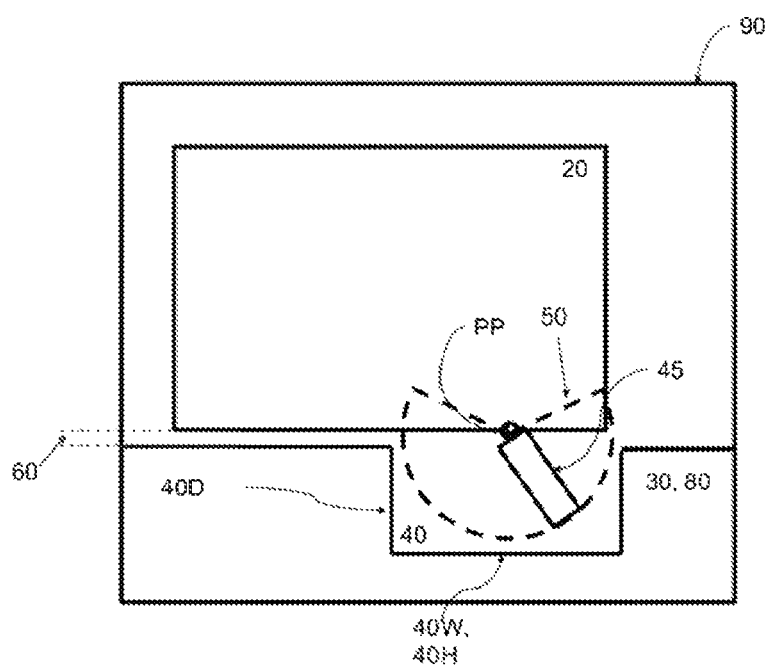

FIG. 3D shows a fourth example of the cutout 40. The vehicle 20 approaches the stopping station 15 by driving sideways in a so-called "crab walk" or "dog walk" approach. The crab walk describes independently steering the wheels 45. The independent steering of the wheels can be achieved by having a four wheel steering system. The independent steering of the wheels 45 allows the wheels 45 to be set to similar or different steering angles relative to the forward driving direction FW and relative to other ones of the wheels 45. The front wheels 45f are usually set to steer in a similar or substantially identical direction as the rear wheels 45r. The front wheels 45f and the rear wheels 45r may also be set to different steering angles for turning of the vehicle. This steering of the wheels 45 allows the vehicle 20 to turn efficiently.

The front wheels 45f are set to steer towards the passenger boarding/alighting platform 30 while the rear wheels 45r might be set to steer away from the passenger boarding/alighting platform 30 when approaching the passenger boarding/alighting platform 30. By setting these steering angles for the wheels 45, the vehicle 20 is able to maneuver swiftly and initiate a turn only requiring a small one of the plurality of vehicle stopping surfaces 90. In order to approach the passenger boarding/alighting platform 30 more efficiently, the angles of the wheels 45 can be set to change during the approaching of the passenger boarding/alighting platform 30.

The form or shape of the cutouts 40 is dimensioned to allow the wheels 45 to dock into the cutouts 40 partially or entirely as can be seen from FIGS. 3A to 3D. The wheels 45 on the side of the vehicle 20 facing the passenger boarding/alighting platform 30 and the corresponding wheel hull curve 50 are able to be accommodated within the cutouts 40. This accommodating of the wheel 45 and/or of the wheel hull curve 50 in the cutouts 40 allows the vehicle 20 to stop proximate to the passenger boarding/alighting platform 30. The wheels 45 do not interfere with the with the vehicle-facing surface 85 when docked to the cutouts 40. The docking thereby reduces the gap 60 (see FIG. 3A to 3D). The vehicle 20 therefore does not need to maintain a distance from the vehicle-facing surface 85 of the passenger boarding/alighting platform 30 for the turning of the wheels 45. The vehicle 20 can, knowing the exact position of the cutouts 40 in the stopping station 15 and using the onboard positioning unit 26, stop at the passenger boarding/alighting platform 30 and dock the wheels 45 to the cutouts 40.

Figure 4:
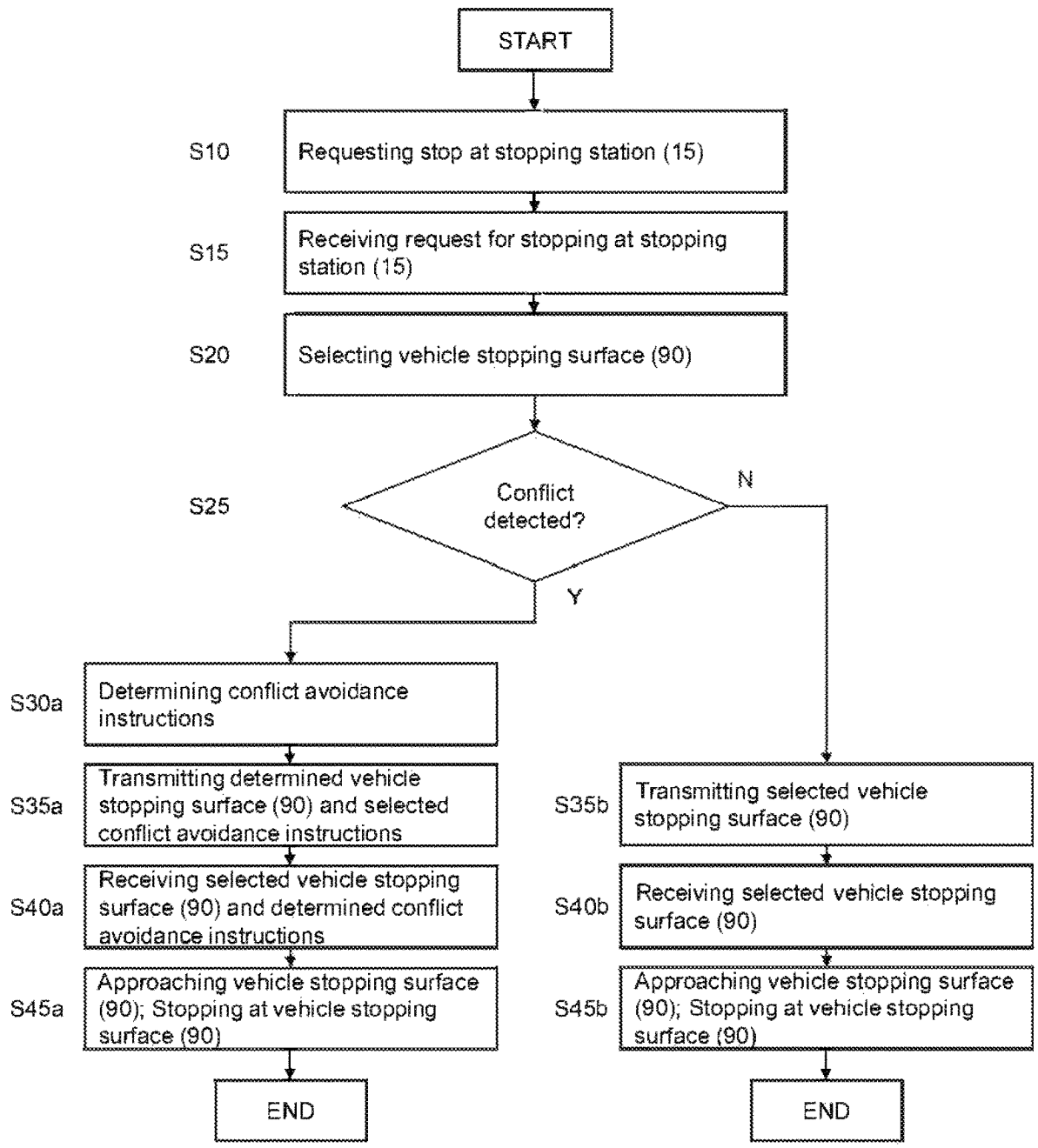
FIG. 4 shows a flowchart describing a method for controlling a movement of vehicles on a selected one of a plurality of vehicle stopping surfaces at a stopping station in the transportation network.

FIG. 4 shows a flowchart describing a method for controlling of the vehicle 20 requesting to stop at the stopping station 15 to one of a plurality of the vehicle stopping surfaces 90. An approaching vehicle 20 requests to stop at the stopping station 15 in step S10. The requesting is done by sending a request using the vehicle antenna 25 and contains, for example, an expected arrival time of the vehicle 20 at the stopping station 15 or a number of passengers travelling in the vehicle 20. The stopping station 15 receives the request from the vehicle 20 via the stopping station communication unit 17 in step S15.

The stopping station control unit 16 selects, in step S20, one of the plurality of the vehicle stopping surfaces 90 for the stopping of the requesting vehicle 20. The selecting of the vehicle stopping surfaces 90 is done, for example, based on the estimated arrival time of the vehicle 20 or the number of passengers travelling in the vehicle 20. The selecting may also be based on a predicted availability of the vehicle stopping surfaces 90. The predicted availability can be calculated by the stopping station control unit 16 knowing the approaching vehicles 20 and the number and position of the vehicle stopping surfaces 90. In other words, the vehicle stopping surfaces 90 are dynamically allocated to the requesting vehicles 20 based on a demand.

The stopping station control unit 16 knows from, for example, the vehicles 20, the roadside control unit, or sensors disposed in the transportation network 100 or disposed at the stopping station 15, a position of the vehicles 20 relative to the stopping station 15. The stopping station control unit 16 also calculates, knowing the position of the vehicles 20, the route for the requesting vehicle 20 to the selected vehicle stopping surface 90 and detects, in step S25, conflicts between the approaching ones of the vehicles 20. This calculating of the route to the vehicle stopping surface 90 is done independently from the calculating of the route by the onboard processor 27 of the vehicle 20 (see above). The stopping station control unit 16 knows from this calculation the routes of the plurality of the vehicles 20 approaching the stopping surfaces 90 of the stopping station 15.

If the stopping station control unit 16 detects, in step S25 the conflict between ones of the approaching vehicles 20 having requested the stopping at the stopping station 15, the stopping station control unit 16 determines conflict avoidance instructions for avoidance of the determined conflict in step S30a. The selected one of the plurality of the vehicle stopping surfaces 90 and the conflict avoidance instructions are transmitted to the requesting vehicle 20 in step S35a. The requesting vehicle 20 receives items of data identifying the selected vehicle stopping surface 90 and the route to the selected vehicle stopping surface 90 in step S40a. The vehicle 20 approaches (see also step S120 in FIG. 6), using the received items of data on the vehicle stopping surface 90 and the conflict avoidance instructions and stops (see step S140 in FIGS. 6 and S220 in FIG. 6) the vehicle stopping surface 90 in step S45a.

If the stopping station control unit 16 does not detect the conflict between ones of the approaching vehicles 20 having requested to stop at the stopping station 15 in step S25, the selected vehicle stopping surfaces 90 is transmitted to the requesting vehicle 20 in step S35b. The requesting vehicle 20 receives items of data identifying the selected vehicle stopping surface 90 in step S40b. The vehicle 20 approaches (see also step S120 in FIG. 6), using the received items of data on the vehicle stopping surface 90 and stops (see step S140 in FIGS. 6 and S220 in FIG. 6) on the vehicle stopping surface 90 in step S45b.

Figure 5:
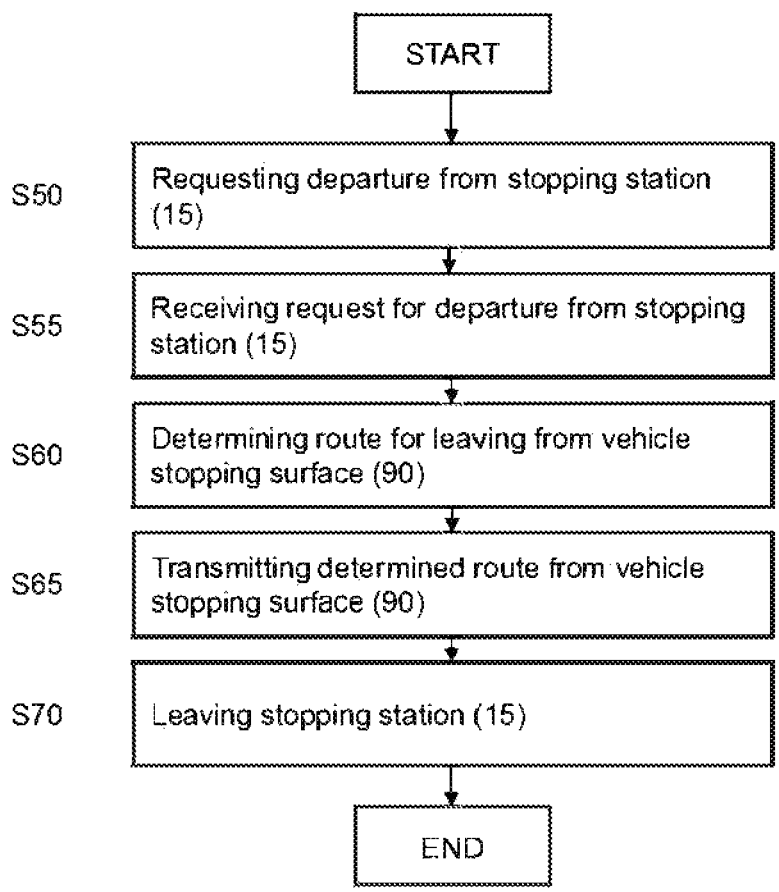
FIG. 5 shows a flowchart describing a method for controlling a departure of a vehicle requesting to depart from a stopping station.

FIG. 5 shows a flowchart describing a method for controlling a departure of the vehicle 20 requesting to depart from the stopping station 15. In step S50 the vehicle requests to depart from the stopping station 15. The requesting to depart from the stopping station 15 by the vehicle 20 is done by a departure request using the vehicle antenna 25 and the stopping station communication unit 17. The stopping station control unit 16 receives the departure request to depart from the stopping station 15 by the requesting vehicle 20 in step S55. The stopping station control center 16 determines, in step S60, a route for the leaving of the stopping station 15 by the requesting vehicle 20. The determining of the route for the leaving of the stopping station 15 is done using the known position of the vehicles 20 and the known position of the vehicle stopping surfaces 90. The stopping station communication unit 17 transmits, in step S65, the determined route for the leaving of the stopping station 15 to the requesting vehicle 20. The requesting vehicle 20 leaves, using the route received from the stopping station control center 16, the stopping station 15 in step S70. The stopping station control unit 16 is capable of monitoring the leaving of the vehicle 20 using the sensors. The stopping station control unit 16 monitors, for example, if the passenger or an obstacle is on the vehicle stopping surface 90 or close to the vehicle stopping surface 90. The stopping station control unit 16 may inform the vehicles 20 of the passenger or the object to avoid a conflict with the vehicles 20.

Figure 6:
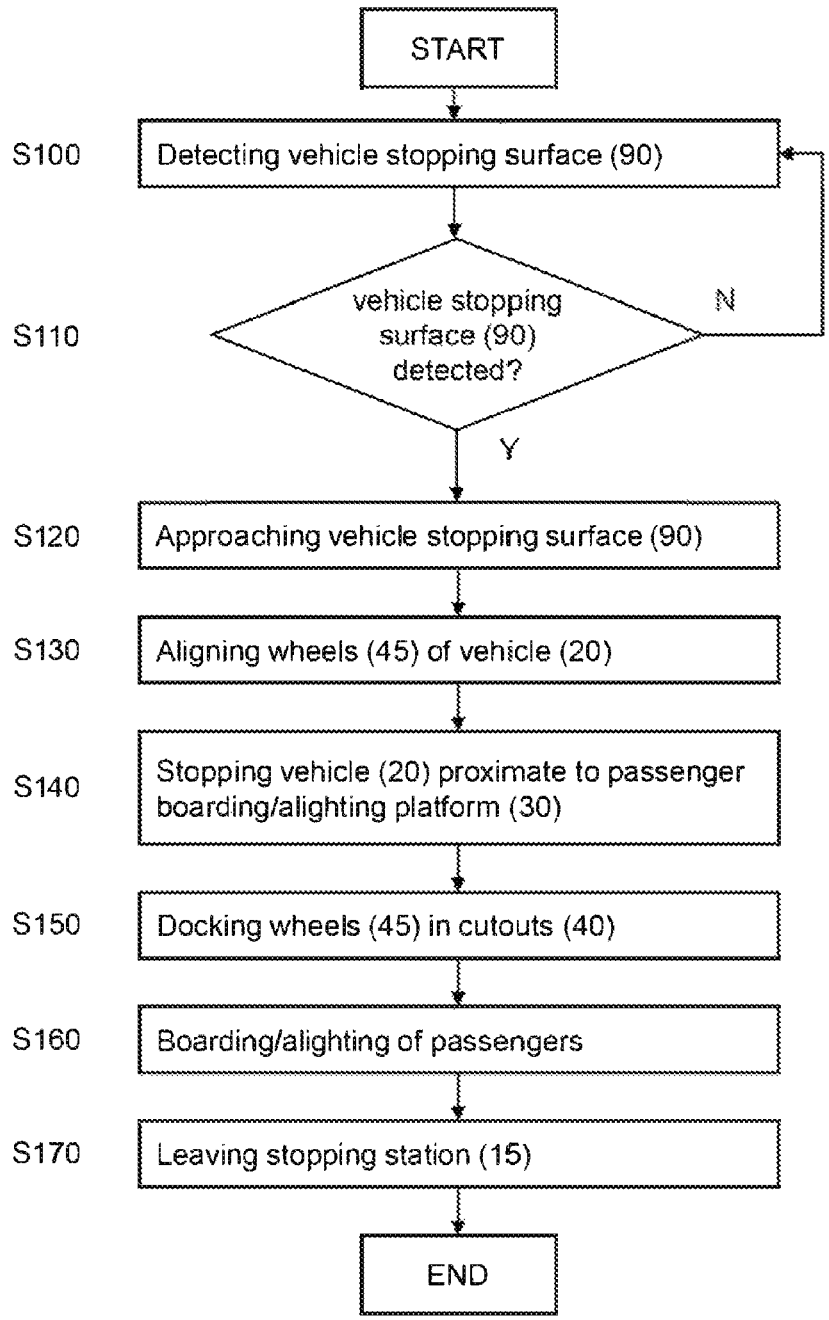
FIG. 6 shows a flowchart describing a method for boarding/alighting of a passenger at a boarding/alighting platform.

FIG. 6 shows a flowchart describing a method for boarding/alighting of the passengers at the passenger boarding/alighting platform 30 into/from the vehicle 20 in the transportation network 100. The vehicle 20 knows the approximate position of the vehicle stopping surface 90 in the transportation network 100 from the structure model 75 stored in the vehicle memory 28. The vehicle 20 detects in step S100, using the onboard processor 27 and the onboard positioning unit 26, the exact position of the vehicle stopping surface 90 disposed in the transportation network 100. A check is conducted in step S110 to verify that the vehicle 20 has detected the vehicle stopping surface 90.

If the vehicle 20 has detected the vehicle stopping surface 90 in step S100, the vehicle approaches the vehicle stopping surface 90 in step S120. If the vehicle has not detected the stopping station, step S100 is reiterated. Approaching the one of the plurality of the vehicle stopping surfaces 90 is done, by driving from a road of the transportation network 100 onto the one of the plurality of the vehicle stopping surfaces 90.

The vehicle 20 aligns, in step S130, the wheels 45 of the vehicle 20 to the position of the cutouts 40 disposed on the vehicle-facing surface 85 of the passenger boarding/alighting platform 30. Aligning the wheels 45 of the vehicle 20 to the cutouts of the vehicle-facing surface 85 of the passenger boarding/alighting platform 30 comprises calculating the alignment of the vehicle 20 with the cutouts 15 in the onboard processing unit 26 of the vehicle 20. The calculating is done using the known position of the stopping station 15 (see step S100) and items of information on the position of the cutouts 40 relative to the stopping station 15 stored in the structure model 75. Aligning the wheels 45 further comprises calculating the angle of the wheels 45 relative to the vehicle 20 during the approaching of the vehicle 20 and setting the angle of the wheels 45 to the calculated angle during the approaching to the passenger boarding/alighting platform 30. The cutouts 40 are dimensioned according to the wheel hull curve 50 of the vehicle and enable the rotation of the wheel 45.

The vehicle 20 stops, in step S140, proximate to the passenger boarding/alighting platform 30. The aligning of the wheels 45 to the cutouts 40 disposed in the passenger boarding/alighting platform 30 enables the stopping of the vehicle 20 proximate to the passenger boarding/alighting platform 30. In a case, where the wheels 45 are flush or aligned with the side 21 of the vehicle 20, the dimension of the cutouts 40 is, for example, relatively small since the cutouts 40 might only be needed for the turning of the wheels 45 during the stopping S140 and the docking S150 of the vehicle 20 or during the leaving S170 of the stopping station 15. In a case, where the wheels 45 stick out from the vehicle 20, the dimension of the cutouts 40 is, for example, bigger (compared to the dimension of the cutouts when the wheels 45 are flush or aligned with the side 21).

The vehicle 20 docks the wheels 45 of the vehicle 20 in the cutouts 40 of the passenger boarding/alighting platform 30 in step S150. In step S160, the passengers board/alight the vehicle 20 from/onto the upper surface 80 of the passenger boarding/alighting platform 30.

The vehicle 20 leaves the stopping station 15 in step S170 after the boarding/alighting of the passengers has been completed. The leaving of the stopping station 15 is done in a similar way as the approaching to the stopping station 15 (see step S120) above.

Figure 7:
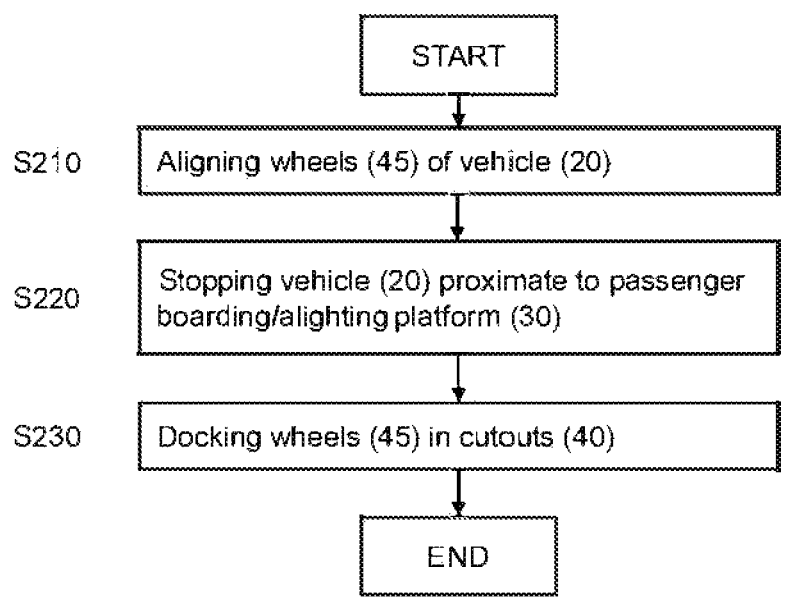
FIG. 7 shows a flowchart describing a method for management of vehicles at the boarding/alighting platform.

FIG. 7 shows a flow chart describing a method for management of the vehicles 20 at the stopping station 15 in the transportation network 100. The vehicle aligns, in step S210, the wheels 45 of the vehicle 20 to the cutouts 40, as described in step S130 of FIG. 6 (see above). In step S220, the vehicle stops at the stopping station 15 proximate to the passenger boarding/alighting platform 30. The vehicle 20 docks the wheels 45 in the cutouts 40 in step S230.

REFERENCE NUMERALS

15 stopping station
16 stopping station control unit
17 stopping station communication unit
20 vehicle
21 side
25 vehicle antenna
26 onboard positioning unit
27 onboard processor
28 vehicle memory
30 passenger boarding/alighting platform
40 cutout
40$w$ cutout width
40$h$ cutout height
40$d$ cutout depth
45 wheel
45$f$ front wheel
45$r$ rear wheel
50 wheel hull curve
75 structure model
80 upper surface
85 vehicle-facing surface
90 vehicle stopping surface
100 transportation network

The invention claimed is:

1. A stopping station for use in a transportation network, the stopping station comprising:
   a passenger boarding/alighting platform having an upper surface for boarding of passengers into a vehicle;
   the passenger boarding/alighting platform having a vehicle-facing surface comprising at least two of a cutout for docking of a wheel, wherein the form of the cutout is dimensioned according to a wheel hull curve of at least one wheel of the vehicle and the number of cutouts disposed on the passenger boarding platform correlates to the number of wheels of the vehicle on a side of the vehicle facing the passenger boarding/alighting platform; and
   a plurality of vehicle stopping surfaces adjacent to the vehicle-facing surface, wherein the plurality of the vehicle stopping surfaces are used for the stopping of the vehicle during boarding/alighting of the passengers.

2. The stopping station according to claim 1, wherein:
the passenger boarding platform is made of at least one of concrete, asphalt, steel, steel-reinforced concrete, lawn stones, or wood.

3. The stopping station according to claim 1, wherein:
the cutout is dimensioned to enable rotation of the docked wheel.

4. A method for controlling a movement of one of a plurality of vehicles to one of a plurality of vehicle stopping surfaces at a stopping station, the method comprising:
receiving from the one of the plurality of the vehicles a request for stopping at the one of the plurality of the vehicle stopping surfaces of the stopping station;
selecting the one of the plurality of the vehicle stopping surfaces for stopping of a requesting one of the vehicles at the one of the plurality of vehicle stopping surfaces; and transmitting the selected vehicle stopping surface to the requesting one of the plurality of the vehicles;
wherein the selecting of the one of the plurality of the stopping surfaces comprises selecting cutouts for docking of wheels of the requesting one of the plurality of vehicles to a passenger boarding/alighting platform, and wherein the form of the cutout is dimensioned according to a wheel hull curve of at least one wheel of the vehicle and the number of cutouts disposed on the passenger boarding platform correlates to the number of wheels of the vehicle on a side of the vehicle facing the passenger boarding/alighting platform.

5. The method of claim 4, wherein:
the selecting of the one of the plurality of the stopping surfaces is based on at least one of an expected arrival time of the requesting one of the vehicles or a number of passengers travelling in the requesting one of the vehicles.

6. The method of claim 4, wherein:
the calculating is done using a structure model stored in the stopping station control unit, a known position of the requesting one of the vehicles in relation to the stopping station, and a position of the cutouts in relation to the stopping station.

7. The method of claim 4, wherein:
docking of the wheels to the cutouts disposed on a passenger boarding/alighting platform adjacent to the determined one of the plurality of the vehicle stopping surfaces.

8. The method of claim 4, wherein:
the transmitting of the selected vehicle stopping surfaces further comprises transmitting of conflict avoidance instructions.

9. The method of claim 4, further comprising:
detecting a conflict between approaching ones of the vehicles.

10. The method of claim 9, further comprising:
determining conflict avoidance instructions for avoidance of the conflict between the approaching ones of the vehicles.

11. A method for controlling a departure of vehicles from a stopping station in a transportation network, the method comprising:
receiving, from one of a plurality of vehicles docked to a cutout disposed on a passenger boarding/alighting platform adjacent to the one of a plurality of vehicle stopping surfaces, a request for departure from the stopping station;
determining, by a stopping station control unit, a route for leaving of the requesting one of the vehicles from the one of the vehicle stopping surfaces; and
transmitting the determined route for the leaving of the vehicle stopping surfaces to the requesting one of the plurality of vehicles.

12. The method of claim 11, wherein:
the determining of the route for the leaving of the stopping station is done using a known position of a plurality of vehicles docked to the cutouts of the stopping station.

13. A method for boarding/alighting passengers at a passenger boarding/alighting platform in/from a vehicle in a transportation network, the method comprising:
approaching a vehicle stopping surface by the vehicle;
aligning wheels of the vehicle with a plurality of cutouts disposed in a vehicle-facing surface of the passenger boarding/alighting platform, wherein the form of the cutout is dimensioned according to a wheel hull curve of at least one wheel of the vehicle and the number of cutouts disposed on the passenger boarding platform correlates to the number of wheels of the vehicle on a side of the vehicle facing the passenger boarding/alighting platform;
stopping the vehicle proximate to the passenger boarding/alighting platform;
docking the wheels of the vehicle in the cutouts of the to the passenger boarding/alighting platform;
boarding/alighting of passengers at the vehicle; and
leaving the stopping station by the vehicle.

14. The method according to claim 13, wherein:
detecting the vehicle stopping surface disposed in the transportation network is done using an onboard positioning unit and an onboard processor of the vehicle.

15. A method for management of vehicles at a stopping station in a transportation network, the method comprising:
aligning wheels of the vehicle with a plurality of cutouts disposed at a vehicle-facing surface of the passenger boarding/alighting platform, wherein the form of the cutout is dimensioned according to a wheel hull curve of at least one wheel of the vehicle and the number of cutouts disposed on the passenger boarding platform correlates to the number of wheels of the vehicle on a side of the vehicle facing the passenger boarding/alighting platform;
stopping of the vehicle proximate to the passenger boarding/alighting platform; and
docking the wheels of the vehicle in the cutouts of the to the passenger boarding/alighting platform.

* * * * *